May 7, 1963 R. S. PERLINI 3,088,689

TAPE REEL

Filed May 27, 1960 3 Sheets-Sheet 1

INVENTOR
R.S. PERLINI

BY J W Armbruster
ATTORNEY

May 7, 1963

R. S. PERLINI 3,088,689

TAPE REEL

Filed May 27, 1960

3 Sheets-Sheet 3

United States Patent Office 3,088,689
Patented May 7, 1963

3,088,689
TAPE REEL

Robert S. Perlini, Poughkeepsie, N.Y., assignor to International Business Machines Corporation, New York, N.Y., a corporation of New York Filed May 27, 1960, Ser. No. 32,362
8 Claims. (Cl. 242—71.8)

This invention relates to improvements in tape reel construction and more specifically to construction of an economical precision reel designed to store magnetic tape of narrow width.

Heretofore, in the construction of narrow tape reels entirely of plastic, it has been found that when the reel is fully loaded, distortion is likely to take place and cause binding of the reel hub on the support shaft or driving arbor, making it difficult to change reels. On the other hand, when the reels are made wholly or partly of metal for reasons of strength then the structure becomes so heavy as to hinder the rapid operation of magnetic tape feeding or necessitate driving forces and braking facilities of rather large magnitude.

Therefore, it is the object of the present invention to provide a tape reel having the precision characteristics of the heavy and expensive metallic type and yet preserving the economical advantages of plastic construction. This is achieved by making the hub section of a light metal such as aluminum and forming it with relieved sections to simulate the strength characteristics of an I beam section by forming the hub with a U-shaped section facing toward one hub side and an E-shaped section facing toward the other side with a common web in between. This E-shaped section is cut out at intervals for lightness and also arranged with two separate spaced circular arrays of pin or screw receiving openings wherein plastic flange or head portions of the reel are secured to the hub. This light metal hub is formed as a die casting and machined in all critical areas especially at the central opening to fit correctly on the supporting pivot or arbor and also precision machined at the sides because in the case of narrow reels it is essential that the two sides be perfectly parallel so that the flanges or head sections secured thereto are also perfectly parallel to avoid binding the magnetic tape when winding or rewinding.

In order to preserve the parallelism of the flanges as already noted, the flanges are designed to be assembled without any captive cement appearing between the machined sides of the hub and the cooperating sides of the assembled flanges. Instead, some adhesive or cement is applied only in those areas inside the E- and U-shaped sections of the hub which merely cooperate with the plastic flanges without having any effect on the dimensions of the flanges with respect to each other and with respect to the central hub. In addition to the use of cement for holding the flanges on to the hub, the annular portions or extensions of the plastic flanges are fitted into the U-shaped section and half of the E-shaped section respectively on the separate sides of the hub, these annular portions are formed with pin receiving openings arranged in circular formation to agree with the spacing of the openings in the central web of the hub for purposes of securing the plastic flange to the hub at a plurality of spaced positions around the inner circular formation to securely hold the inside of the plastic flange against the precision machined outer edges of the hub. These securing pins are headed and may be of a metallic or plastic form or of a self-threading variety but are preferably of a plastic form whereby the application of solvent and clamping facilities in connection with the assembly causes the headed pin and assembled plastic flange to be securely fastened and keyed into position by reason of the plastic pins and associated plastic flange area dissolving and re-hardening to conform to the differences in hole and surface locations without distortion of the plastic flange which extends appreciably outward beyond the outside diameter of the hub and it is desired that such flange extension remain perfectly planar and parallel with the mating flange on the opposite side of the hub. An alternate economical design is one in which the plastic pins are molded as part of the flange hub and hot formed to provide heads after inserting the reel onto the aluminum hub.

In order to cover the heads of the pins for purposes of appearance, the flanges are assembled in the sequence whereby the flange is fitted into the upper part of the E-shaped section first so that the heads extending therefrom are covered by the assembly of the flange having annular extension fitted into the wide U-shaped section, the latter being assembled by pins having heads extending into the inner part of the E-shaped section. These last mentioned heads are also covered by a removable ring which is ordinarily fitted into all reels to provide a file protecting operating member which ordinarily permits the tape unit to record when such a ring is encountered by a sensing pin located on the magnetic tape handling machine.

From the foregoing, it may be gathered that an important object of the present invention is to provide an economically formed precision narrow flange tape reel.

Another object of the invention is to provide a reel formed of composite materials with light metal construction in the critical hub area with plastic flanges or heads, and attaching formations in all other areas.

Another object of the invention is to provide a reel of an economical construction and yet strengthened as to its centralized and parallel flange construction to be free of distortion in all areas.

A still further object of the invention is the provision of an assembled plastic reel wherein mating surfaces are free of captive cement and free of dimenisonal instability usually caused by variable application of such joining materials. A further object of the invention is the provision of a precision reel formed with a light metal hub having strengthened sections without undue material and weight. The hub section used is provided with a common central web which together with the wider inner and outer ring portions of the hub form opposite U- and E-shaped sections.

A still further object of the invention is the provision of a pair of sets of attaching pins or screws arranged in offset circular arrays so that the cooperating pair of flanges may be separately clamped and assembled and so that the heads of one set of assembled pins may be covered by a secondary operation involving assembly of the second flange having a smaller internal diameter.

Another object of the invention is the provision of pairs of spaced and machined rings on the sides of the hub which cooperate with the inner sides of the flange to provide a precision aligning means with such spacing between ring diameters affording a very precise parallel support system for the narrow flange gap. Heretofore, many constructions afforded only one such ring and consequently there was not the precision offered by the dual nature of the machined rings of the U- and E-shaped sections on the hub of the present invention.

The foregoing and other objects, features and advantages of the invention will be apparent from the following more particular description of preferred embodiments of the invention, as illustrated in the accompanying drawings.

Figures 1, 4, 4A:
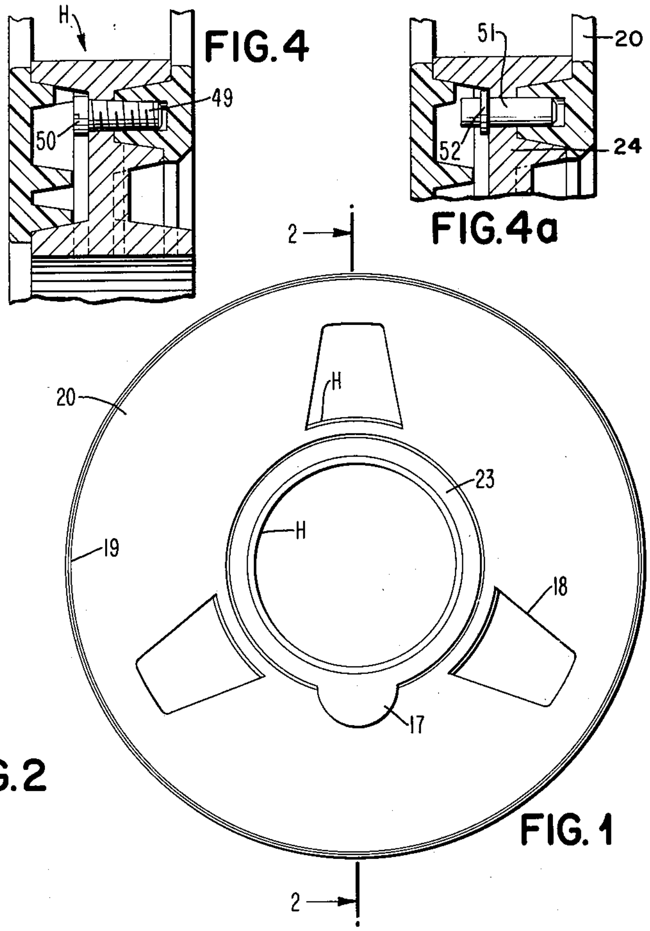
FIGURE 1 is a side elevation view of the complete reel showing the file protecting ring assembled and covering the heads of the inner ring of assembly pins or screws.
FIGURE 4 is a detailed sectional elevation view showing a modified form of assembly procedure wherein self-tapping screws are used instead of plastic pins.

FIGURE 4*a* is a detailed sectional elevation view of another variety or modification of a securing means in the form of metal pins molded in place when the plastic flanges are molded.

Figures 5, 6:
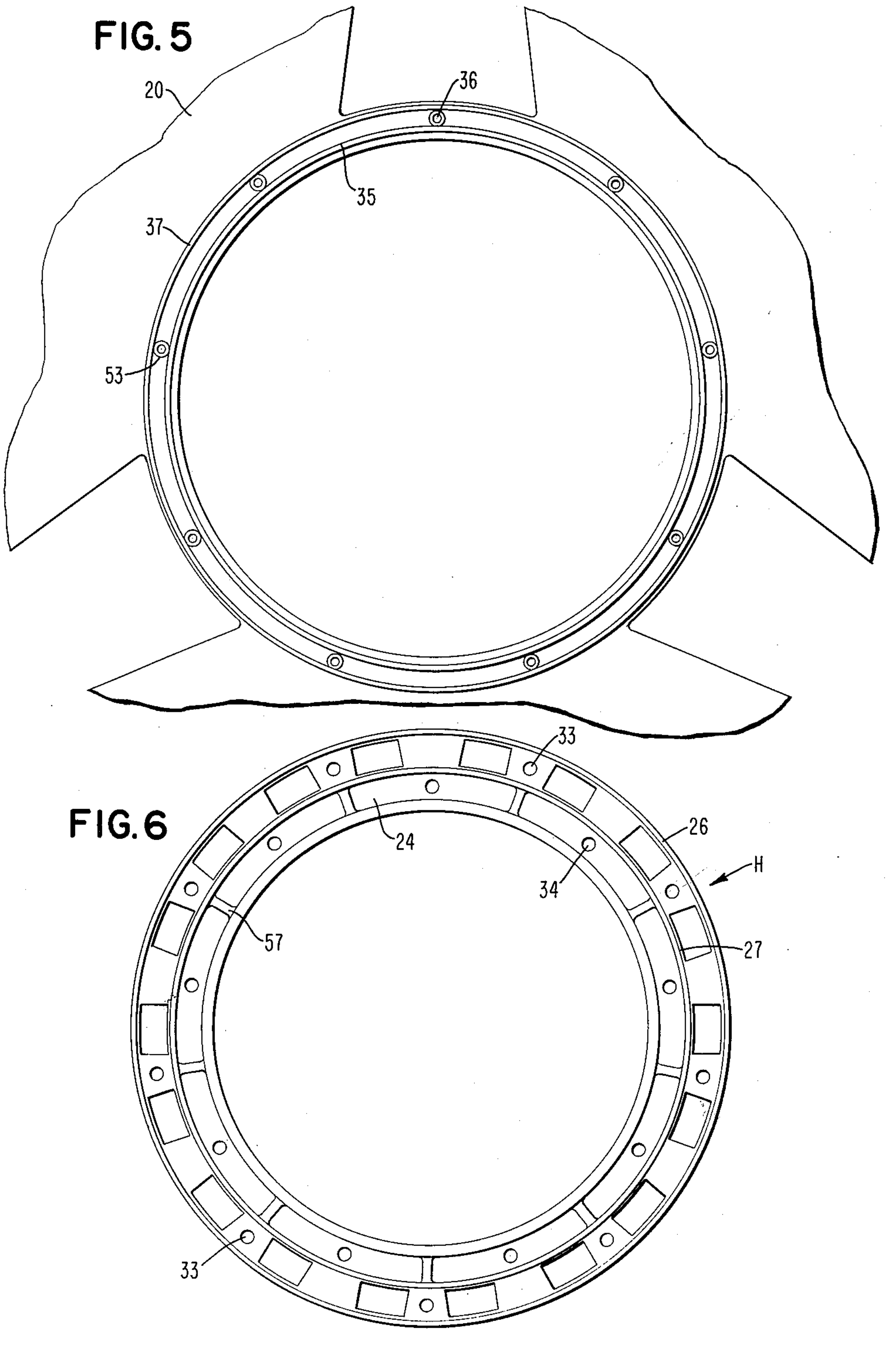

FIGURE 5 is a side elevation view showing the plastic ring formations and pin openings in the one flange which is adapted to be assembled on the side of the metal hub formed with the E-shaped section as shown in FIGURE 6.

FIGURE 6 is an elevation view of the metal hub showing the side formed with the E-shaped section which is designed to receive the raised plastic flange ring formations shown on the flange illustrated in FIGURE 5.

Figure 7:
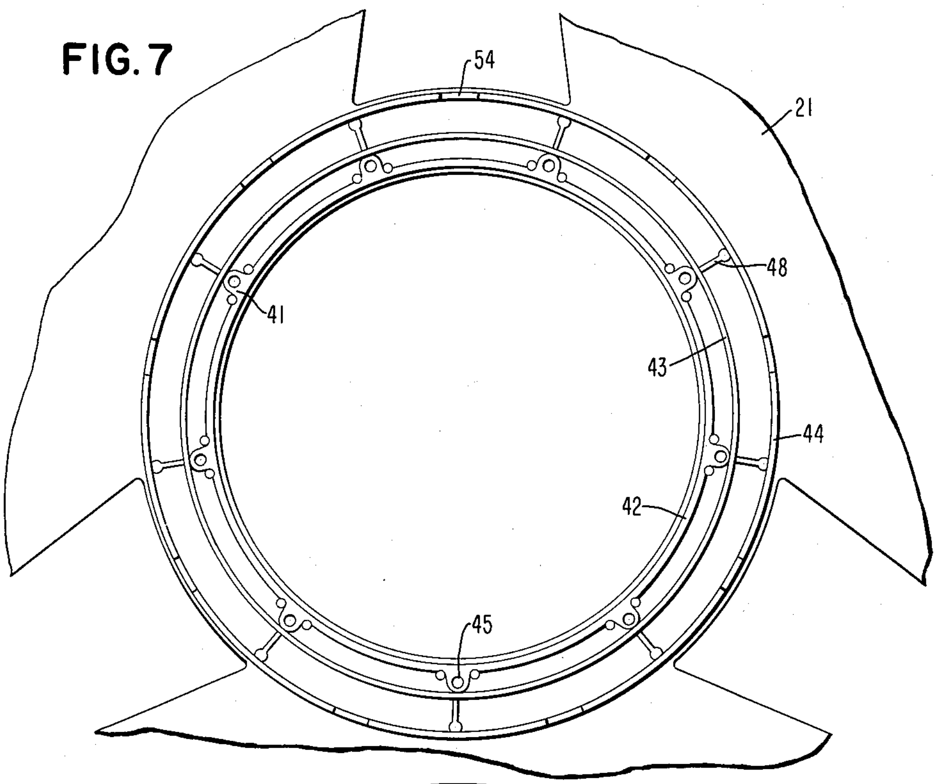

FIGURE 7 shows an elevation view illustrating the inner ring formations of the second flange which is designed to cooperate with the part of the hub formed in a U-shaped section.

Figure 8:
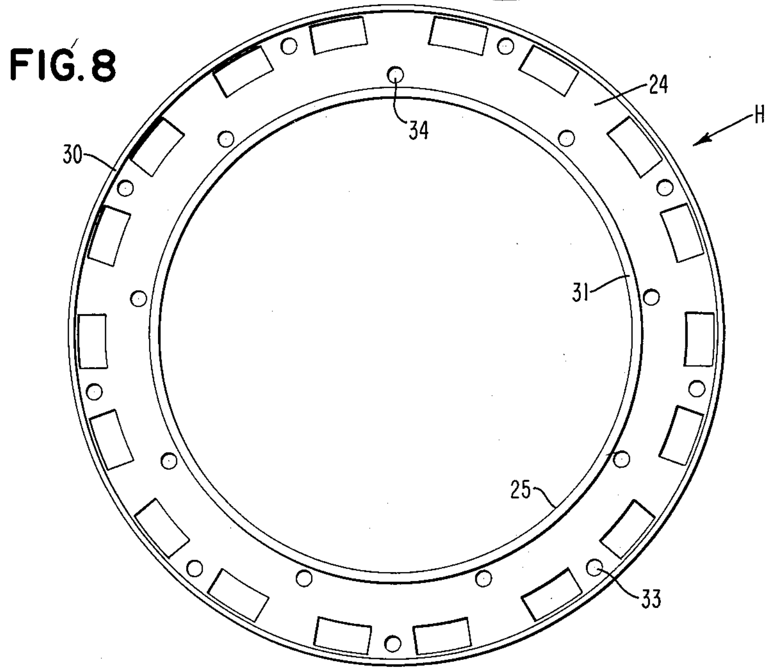

FIGURE 8 is an elevation view of the side of the hub formed in a U-shaped section wherein the common central web of the hub is formed with an inner set or ring of pin receiving openings or holes designed to receive and secure the plastic flange of FIGURE 7.

As already stated in the objects of this invention, this particular reel was devised to fulfill the need for a precisely constructed reel formed of economical materials which could be put together rapidly so that the total cost was at a minimum. Heretofore, precision reels required all metal finished construction which resulted in a rather heavy member to drive for the reeling or reading of narrow magnetic tape. Although it seemed that a wholly plastic reel was the answer to both precision and economical requirements, it was found that hub formations of plastic were not only subject to distortion in the process of manufacture but also became distorted when the reels were fully loaded and tended to bind on the drive arbors making it difficult to assemble and remove the reels from the magnetic tape reading and writing equipment.

Figure 2:
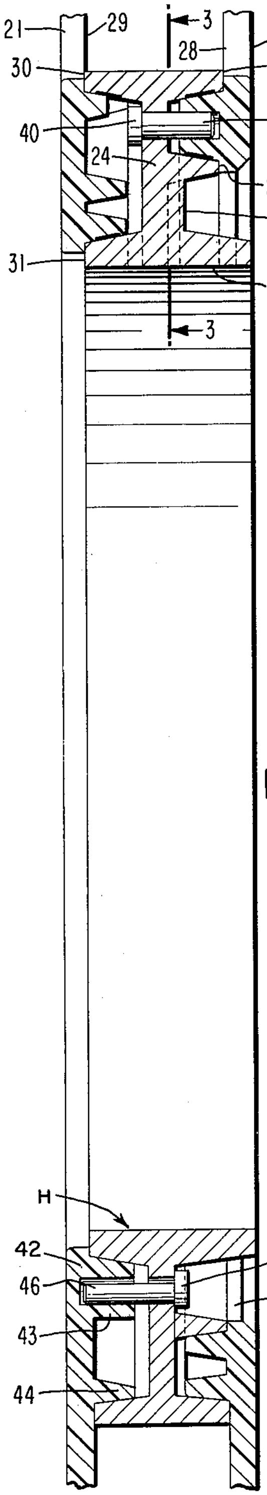
FIGURE 2 is a sectional view taken along line 2—2 in FIGURE 1 and showing the formation of the metal hub and the manner in which the plastic flanges are secured thereto.

In order to provide a form of construction eliminating much of the weight of prior heavy metallic reels, the present construction uses light cut-out plastic flanges with a central light metal hub. The hub H is best shown in FIGURE 2 where the cross-section view illustrates how the die cast ring of a light metal such as aluminum or magnesium may be formed to provide a rigid central hub formation and at the same time be formed to receive and hold the flanges in a novel and improved manner. This hub H is also shown in the side elevation view, FIGURE 1, wherein it is illustrated how one of the flanges 20 is assembled on the side of the hub with portions of the hub projecting as inner and outer rings, the inner surface being finished to fit on a shaft or arbor of magnetic tape equipment to either rotate thereon or be driven by a rotating member. In FIGURE 1 it is seen that the flange 20 is formed with an outer rib or bead 19 and a central depressed ring formation 22 (FIGURE 2) into which there is deposited a plastic ring 23 (FIGURE 1) which is the file protecting operator used to extend an operating bell crank to prevent the erasing of any of the magnetically recorded information while the tape reel is assembled in the magnetic reading equipment. On ring 23, a tab 17 may be grasped to pull and remove the ring. Radial openings 18 are formed in flange 20 as observation openings as well as to lighten the construction.

Returning again to consideration of the hub H as shown in FIGURE 2, there it is noted that the hub in cross-section comprises a U-shaped section facing to the left and an E-shaped section facing to the right with a common central web 24 constituting part of an I beam section which is the primary form of the die cast hub. Although it is noted throughout this description that the hub is preferably of a light die cast metal such as aluminum, it is evident that the hub could be constructed otherwise of sheet metal or forged or cast material of a heavier nature such as steel or brass.

Several hub surfaces and areas are finished by machining a number of locations to prepare the hub for precision assembly of the side flanges. Of course, the inner ring surface 25 is a finished surface to fit accurately onto the central support or rotating member, but in addition to this finished surface, the outer area of the top leg of the E formation as at 26 is finished and so also is the outer surface of the central extension of the E formation at 27. These spaced ring surfaces form precise flange supporting areas, the spacing and alignment of which provide a valuable meassure of precision to keep the inner edge 28 of the flange 20 precisely arranged at right angles to the axis of the hub and also accurately spaced relatively to the other inner edge 29 of the other flange 21. In order to preserve these accurate spacings, the other side ring edges 30 and 31 of the outer edges of the legs of the U-shaped section comprising the left side of the hub H are also machined to be very accurately dimensioned and the wide spacings of these finished surfaces act to align the flange inner surface 29 in a very accurate right angle relationship to the axis of the hub and also very accurate with regard to parallelism relative to the other flange surface 28.

In order that these accurate machined engagements between the machined hub and the plastic sides should not be disturbed by intervening adhesive, the adhesive is not put on such outer contacting surfaces but instead is used on the inner mating surfaces between the projecting flange ring portions and the insides of the U and E shapes of the hub. These adhesive areas are shown as darkened formations in the drawing FIGURE 2, and it is noted from the location of these areas that the adhesive material entrapped therein is located so as to avoid any projection into the spaces of accurate contact 26, 27, 30 and 31 already noted.

Although adhesive such as Resiweld is used as a sort of preliminary binder between the hub and the flanges, a more positive and permanent form of juncture is used in the form of two sets of spaced rings of pins 38 and 46 or screws used to key the flanges to the hub in a positive fashion.

As shown in FIGURE 6, the central web 24 of the hub H is formed with two sets of holes 33 and 34, the one set comprising nine holes 33 arranged in a ring in the outer portion of the web between the upper and middle extensions of the E formation. The second set of holes 34 are also nine in number and arranged in a ring between the middle and lower legs of the E-shaped section. It is noted that the arrangement of the holes in the two different sets are staggered in position so that the holes of alternate sets are not radially aligned or directly opposite each other. In FIGURE 5 it is shown that the flange 20 is formed with a pair of extending circular rings or ridges of plastic 35 and 37 and within these rings are formed recesses or indentations 36, nine in number and spaced to conform with the spacing of the nine holes 33 in hub H, FIGURE 6. If it is imagined that the plastic flange 20 of FIGURE 5 is maintained in position on a flat horizontal surface and then the metal hub H of FIGURE 6 is slowly pivoted by grasping the lower end and bringing it over at an arc of 180 degrees so that the lower-most hole 33, FIGURE 6, is aligned with the uppermost indentation 36, FIGURE 5, then the hub may be dropped into position with the rings 35 and 37 of flange 20 fitting within the pair of outer rings of the E hub section as noted in FIGURE 2. With the flange 20 and hub H so positioned, the two parts are ready for the insertion of assembly pins 38. However, prior to the assembly of the flange and hub as noted, a series of applications of adhesive is made around the inner surfaces of contacting hub and flange areas as noted by the darkened lines inside the E and U formations. The adhesive cometimes used is known as Resiweld, but it is obvious that other forms of adhesive are applicable.

Returning to consideration of how the flange is pinned to the hub, it may be noted that while the flange (FIGURE 5) is in a horizontal position with the indentations exposed through the holes 33 in the hub, drops of solvent may be placed in the indentations ready to receive the plastic pins. An example of the solvent used may be regarded as 60 percent by weight of toluol and 40 percent of ethyl acetate. Although the form of plastic used for the flanges and the pins is of the thermoplastic injection mold type known as Dylene or Lustrex, it is obvious that other forms of plastic may be used such as Merlon, Texlon or phenoxy polycarbonates and in such instances, the solvent will be used appropriate for softening and forming the pin connection to provide a solid attachment.

Figure 3:
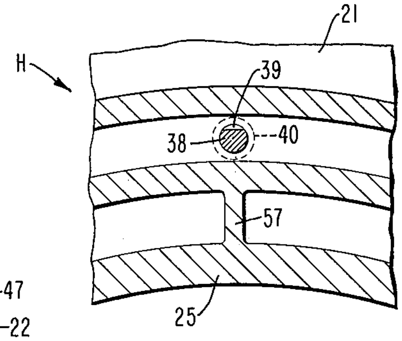
FIGURE 3 is a detailed sectional elevation view taken along line 3—3 in FIGURE 2 and showing the manner in which the shank of the headed pin is relieved by a longitudinal flat or groove along the shank of the pin whereby solvent may rise upon insertion of a pin and overflow under the head of the pin.

Returning to consideration of the pin connection, it was noted that the drop of solvent in the indentation 36 awaits insertion of the pin 38. The shank of this pin 38 is not tightly fitted or truly circular in cross-sections but it is proportioned as shown in FIGURE 3 where it is noted that the pin shank 38 is flattened on one side to allow a space 39 between the indentation 36 and hole 33 whereby insertion of the pin causes the solvent to "well up" or overflow underneath the head 40 of the pin and tend to soften that area in addition to the areas of pins, shanks and indentation which are initially softened and then later hardened to form a solid homogenized plastic material of a keying nature. After the pins are inserted, pressure is applied upon the heads or a clamp is applied to insure that the flange 20 and the clean precision surfaces 26 and 27 of the aluminum hub are brought into close registration while the plastic pin areas harden to maintain them in that condition.

Although the plastic pins 38 are shown headed, they could be molded without heads and as part of the flange extended so that later a hot forming member could put a rounded head on the pin. Instead of a formed head, a forced or heated ring could be put on each pin as a head.

By observing the top portion of FIGURE 2, it will be apparent that after this first stage of assembly of the one flange 20 onto the hub H, the pin heads 40 are exposed and would not present a clean surface if assembly was terminated in such a condition. However, the second stage of assembly provides the flange 21 which has a smaller internal diameter as noted in FIGURES 7 and 2, with extending ring portions completely covering the U-shaped formation of the hub H and not only securing therefrom a broadly based pair of machined and precision bearing surfaces 30 and 31 but also completely enclosing the hub U opening and covering the heads 40 of the first set of pins and thereby providing an attractive outward appearance.

As shown in FIGURES 2 and 7, the flange 21 is formed with three inwardly projecting rings 42, 43 and 44, the first and last mentioned rings bearing against the inner surfaces of the lower and upper legs of the U-shaped formation and it is around such surfaces that the adhesive is applied discreetly as noted in connection with the other flange 20.

It was noted heretofore in connection with the hub formation that there is a series of nine holes 34 in the common web 24 of the hub, said holes 34 being regularly spaced in a ring around the web of the hub and staggered or offset in position relative to the other holes 33, and now in FIGURE 8 it may be noted how these holes 34 pair with aligning recesses or indentations 45, FIGURE 7, formed in the inner plastic portion of the flange 21. These indentations or openings 45 are also nine in number and situated to align with holes 34 and they are present in that area of the plastic extending between the inner ring 42 and the central leg 43 of the E-shaped formation. At the bottom of FIGURE 2 it is seen how a set of pins 46 are inserted to join the flange 21 to the hub H. These pins 46 are assembled in the same fashion as the pins 38 already noted, by means of preliminary application of drops of solvent and insertion of the pins with subsequent pressure or clamping action. This operation of assembling the second flange 21 is performed by placing the flange with the outer face downward on a horizontal surface before the assembly of the hub and the application of the solvent. After the pins are assembled it is apparent from the showing at the bottom of FIGURE 2 that the heads 47 of the set of pins 46 are exposed through the ring opening 22 which is the inner ring of the E-shaped formation. However, this ring opening is later covered by the file protecting plastic ring 23 so that this outer surface also presents a smooth attractive appearance as well as the other side involving flange 21 which covers the heads of the other set of assembly pins.

As a matter of orientation, the hub H is first put on flange 20 with the holes and indentations matching for pin insertion. For the second operation to assemble flange 21, it is placed in the U-shaped hub section with its window openings 18 aligned with those of flange 20 and this in turn lines up holes 34 with indentations 45 of flange 21 and the parts are readily assembled for pin insertion.

Although plastic pins have been designated as the attaching means heretofore, it has been found that other alternatives or modified ways of joining the flanges to the hub may be carried out and still preserve the precision aspect of the assembly. One such modification is shown in FIGURE 4 where a self-tapping screw 49 is shown as used to join the flange 20 to hub H. This screw 49 may be of metal or it may be of the plastic form and used alone or combined with a preliminary deposit of adhesive or solvent. The screw heads 40 of such screws are also covered by the mode of construction noted hereinbefore relative to the two sets of pins. When self-tapping screws are used a greater measure of precision may be obtained if the inner parts of the metal hub are finished as well as the outer surfaces and in such cases the inwardly extending plastic of the flange extensions are also brought into direct contact with the inner part of the hub so that the action of the screws brings about a direct metal to plastic contact with or without the action of the solvent. This modification not only provides means for avoiding the use of solvent, but also eliminates the need for the interval of time required for pin clamping which is otherwise needed to insure that the softened plastic pins are fully hardened.

Another modification assumes the form shown in FIGURE 4*a* wherein a flange 20 in the process of being molded is molded around extending pins 51 which are arranged in a circular array to match the holes in the web 24 of the hub. These pins 51 are formed with a circularly grooved outward extension arranged so that after the hub is assembled thereon, a ring clip 52 may be placed over each extending pin or another expedient such as a metal snap washer may be forced over the pin to securely hold the flange on the hub. A still further modification (not shown separately) would assume the appearance of the pins shown in FIGURE 2. However, fastener application would differ inasmuch as the application of such pins as hot rivets would be employed whereby a metal or plastic insert would cause thermoplastic flange material to flow into position to secure the parts together.

In FIGURE 6 it is noted that the cast hub H is formed with strengthening ties 57 in the open ring area not used by the two plastic rings 35 and 37 of the flange 20, FIGURE 5. These ties 57 also serve as a back stop for the file protector ring 23 to rest upon. The set of nine indentations or holes 36, FIGURE 5, are formed in cylindrical plastic ties 53 which not only form the body of material to receive the pin shanks, but also serve to tie together the plastic rings 35 and 37 and further strengthen the central flange section which has the lightness but strength of a U-shaped formation.

In FIGURE 7 it is noted that with respect to the second flange 21 that the same aspect of lightness but strength of construction is preserved relative to the central section of the flange. Since this central section of flange 21 is to fit within the wide U-shaped section of hub H, FIGURE 8, it is formed with three plastic rings 42, 43 and 44 which in cross section appear as an E-shaped formation to fit into the U-shaped area. As further strengthening means, the rings 42 and 43 are tied together with the nine cylindrical ties 41 having buttress extensions at ring 42, and the rings 43 and 44 are tied together with cross webs 48. At regular intervals the outer ring 44 is formed with notches 54 to avoid touching the heads 40, FIGURE 2, of pins used for the other flange.

From the foregoing it is noted that not only is the hub H of the light but strong characteristics of U- and E-shaped cross sections, but the two flanges 20 and 21 also have such light but strong characteristics at the central E- and U-shaped ring formations, with the E of one flange fitting into the U of the hub and the U of the other flange fitting into the E section of the hub.

In FIGURE 1 it is noted that flange 20 is formed with a circular bead 19 which adds to the stiffness and strength of the flange as well as being ornamental. A number of other such beads (not shown) are formed around open flange areas. A set of three window openings 18 serve to lighten the flange material, provide observation openings and aid in handling or threading tape on the reel. The file protector ring 23 fits snugly within the ring opening 22, FIGURE 2, between the inner hub ring and the inside diameter of the flange 20. A tab 17, FIGURE 1, may be grasped to remove the flexible plastic ring 23.

While the invention has been particularly shown and described with reference to preferred embodiments, it will be understood by those skilled in the art that the foregoing and other changes in form and details may be made therein without departing from the spirit and scope of the invention.

What is claimed is:

1. A reel comprising a hub having an inner ring formation around a circular opening and an outer ring formation supported on a central web between said rings, a middle ring formation on one side of said web, said ring formations and web in cross section appearing as a U-shaped section on one side and an E-shaped section on the other side, with the central web being common to both sections and being the bottom of the U and vertical web of the E, said central web being formed with two sets of holes in circular arrays, one hole array appearing between the outer and middle E ring formations, and the other hole array being between the inner and middle E ring formations, and a pair of flanges, one flange having a ring extension fitting in between the outer and middle E ring formations, said ring extension having holes aligned with said one hub hole array to receive fastening devices therein, and the other flange having a ring extension fitting in between the outer and inner U ring formations, the last mentioned ring extension having holes aligned with said other hub hole array to receive fastening devices therein.

2. A reel of the kind set forth in claim 1 wherein said hub is a light metal casting and the outer surfaces of said hub ring formations are machined for precise dimensions and parallelism, whereby the inside surfaces of the flanges are supported by spaced hub ring formations of accurate spacing and parallelism.

3. A reel of the kind set forth in claim 2 wherein adhesive is applied to hub areas and mating flange areas other than those noted as machined, whereby no captive adhesive occurs between machined hub ring formations and finished flange surfaces to disturb the accurate flange spacing and parallelism.

4. A reel of the kind set forth in claim 1 wherein said flanges are of a plastic and said fastening devices are plastic pins assembled with a solvent and pressure to form welded plastic keying formations in and around said hub and flange holes.

5. A reel of the kind set forth in claim 1 wherein said fastening devices are self tapping screws passing through said hub holes and threaded into said flange ring extensions.

6. A reel comprising a hub formed with outer and inner annular ring portions and a central web and an extra intermediate ring portion on one side of the web whereby said hub in cross section has a U-shaped section facing one side and an E-shaped section facing the other side, a pair of flanges fastened on said hub, one of said flanges being formed with three ring extensions which in cross section appear as an E-shaped formation which is proportioned to fit within the U-shaped section of the hub, and the other of said flanges being formed with two ring extensions which in cross section appear as a U-shaped formation which is proportioned to fit between said outer ring portion and said extra ring portion of said E-shaped section of the hub, and means for fastening said flanges to said hub in the positions noted to form a light but stiff and strong reel.

7. In a tape reel, a cast light metal hub formed with a U-shaped ring section facing one side and an E-shaped ring section facing the other side, said sections having a common vertical web, said E-shaped section comprising outer, middle and inner ring formations, said web being formed with two sets of pin holes arranged in two different circles and staggered in position, a pair of plastic flanges, one flange formed with an inner circular extension fitting within the outer and middle ring formations of said E-shaped ring section and the other flange formed with an inner circular extension fitting within said U-shaped ring section, said flange extensions being formed with holes aligned with said pin holes, and first and second sets of headed plastic pins treated with solvent and inserted through said hub holes and into said plastic flange extension holes, the first set of pins for the flange of the E-shaped section being inserted first whereby the heads thereof are covered by the flange extension fitted into the U-shaped section.

8. A composite reel comprising a metal hub and two plastic flanges, said hub having a central web formed at right angles to the axis of the hub and formed with two circular arrays of staggered holes for assembly of said flanges, said flanges each being formed with a thickened ring and recesses therein aligned with said hub holes in one of said circular arrays, and two sets of self tapping screws assembled through said hub holes and threaded into said recesses to clamp the flanges onto the hub, said thickened rings of said two flanges facing inwardly toward said hub and being of two different diameters, whereby the flange of the larger diameter ring may be assembled first with said screws covered by the flanged assembled second with the smaller diameter ring to present at least one unbroken outer surface where assembled.

References Cited in the file of this patent

UNITED STATES PATENTS

| | | |
|---|---|---|
| 1,263,640 | Boylan | Apr. 23, 1918 |
| 2,015,860 | May | Oct. 1, 1935 |

(Other references on following page)

UNITED STATES PATENTS

| | | |
|---|---|---|
| 2,190,013 | Byers | Feb. 13, 1940 |
| 2,397,362 | Markle | Mar. 26, 1946 |
| 2,475,036 | Lopez-Henriquez | July 5, 1949 |
| 2,736,956 | Stahl et al. | Mar. 6, 1956 |
| 2,808,642 | Fons et al. | Oct. 8, 1957 |
| 2,881,985 | Overmire et al. | Apr. 14, 1959 |

FOREIGN PATENTS

| | | |
|---|---|---|
| 2,262 of 1911 | Great Britain | Mar. 30, 1911 |
| 213,008 | Great Britain | Mar. 24, 1924 |
| 975,627 | France | Oct. 17, 1950 |
| 667,467 | Great Britain | Mar. 5, 1952 |
| 731,018 | Great Britain | June 1, 1955 |